United States Patent [19]

Hayashi et al.

[11] Patent Number: 6,063,538
[45] Date of Patent: May 16, 2000

[54] IMAGE-RECEIVING SHEET

[75] Inventors: Masafumi Hayashi; Noritaka Egashira, both of Tokyo-To, Japan

[73] Assignee: Dai Nippon Printing Co., Ltd., Japan

[21] Appl. No.: 09/177,796

[22] Filed: Oct. 23, 1998

[30] Foreign Application Priority Data

Oct. 31, 1997 [JP] Japan ..................................... 9-314682

[51] Int. Cl.⁷ .............................. G03G 13/20; B32B 5/16
[52] U.S. Cl. ........................... 430/124; 428/195; 428/206; 428/221
[58] Field of Search ..................................... 428/221, 372, 428/195, 206; 430/99, 126, 124

[56] References Cited

U.S. PATENT DOCUMENTS

| | | | |
|---|---|---|---|
| 5,116,666 | 5/1992 | Konno | 428/220 |
| 5,264,271 | 11/1993 | Satake et al. | 428/195 |
| 5,726,283 | 3/1998 | Tsai et al. | 428/221 |

*Primary Examiner*—John Goodrow
*Attorney, Agent, or Firm*—Parkhurst & Wendel, L.L.P.

[57] ABSTRACT

An image receiving sheet is provided which can offer good toner fixation and stably provide excellent image quality, has no significant dependency upon environmental conditions, has constant surface electric resistivity, and can be used also in electrophotography wherein no silicone oil is used at the time of fixation of the toner. Provision of a receptive layer 2 provided on at least one side of a substrate 1, the receptive layer 2 comprising a thermoplastic resin and a conductive material not utilizing ionic conduction, can provide an image receiving sheet 4 that has antistatic properties and surface electric resistivity which are stable against a fluctuation in environmental conditions around the image receiving sheet.

12 Claims, 1 Drawing Sheet

IMAGE-RECEIVING SHEET

TECHNICAL FIELD

The present invention relates to an image receiving sheet, and more particularly to an image receiving sheet that can be used in copying machines and printers utilizing an electrophotographic system wherein the image quality is greatly influenced by surface electric resistivity of both sides of the image receiving sheet. The present invention is also applicable to image receiving sheets for OHP that are highly transparent image receiving sheets.

BACKGROUND ART

In recent years, formation of a full-color image by mixing of three-color toners of yellow, magenta, and cyan, or four-color toners of the above three colors, yellow, magenta, and cyan, and black using an electrophotographic system has been put to practical use.

In order to steadily record and hold record information, such as letters and images, an image receiving sheet used in the electrophotographic system generally comprises a substrate having thereon a receptive layer. This image receiving sheet is used, for example, for OHP (overhead projector) as information transmission means that is used in lecture meetings, schools, enterprises, other briefing sessions, exhibitions and the like.

In a printing mechanism utilizing the electrophotographic system, when an image formed on a photoreceptor is transferred onto an image receiving sheet, the surface electric resistivity of the image receiving sheet should be regulated because the toner is transferred by utilizing electric moment derived from electrification.

In this electrophotographic system, particularly in the case of printing on plastic base substrates, the resultant images considerably vary depending upon the electric resistivity of both sides of the substrates. In order to regulate the surface electric resistivity, antistatic agents have been used in the toner-receptive layer or the outermost surface layer.

For example, Japanese Patent laid-Open No. 81539/1973 discloses that, in order to improve the fixation of the toner and to provide good sheet carriability, a resin solution containing a surfactant such as typified by a quaternary ammonium base is coated on a sheet to specify the surface inherent resistance within a specific range.

In this method, however, since the surfactant has a low molecular weight, the concentration of the surfactant should be increased from the viewpoint of lowering the surface electric resistivity. This poses a problem that the coated face becomes sticky, or the surfactant migrates onto the contact face during the storage of the sheet. This changes the surface electric resistivity. Further, the mechanism used is such that the surface electric resistivity is regulated by ionic conduction. This creates a considerable difference in resistivity between the sheet under high humidity conditions and the sheet under low humidity conditions, making it difficult to always provide images having constant image quality.

Further, for example, Japanese Patent Laid-Open No. 238576/1987 discloses that an acrylic resin having a quaternary ammonium base is coated as a resin having antistatic properties to regulate the electric resistance. This acrylic resin can eliminate the migration of the surfactant onto the contact face. Since, however, the acrylic resin is an ion conductive material, the surface electric resistivity undergoes a change by two to three orders of magnitude upon a change in environmental conditions (temperature and humidity) around the sheet. This in turn causes a change in printability that makes it impossible to provide stable image quality.

Materials according to a system using the principle of electronic conduction is considered effective as materials having given resistance that is less likely to depend upon environmental conditions (temperature and humidity) around the sheet. For example, carbon black has a given resistance in electronic conduction due to mutual contact of the structure. Since, however, carbon black per se is a colored material, the addition of carbon black particularly on the image receiving face side results in coloration of the whole image receiving face that considerably limits the applications of the image receiving sheet.

Further, in current full-color copying machines or printers using the electrophotographic system, the formation of images on the conventional image receiving sheets, when a toner is melted and fixed at the time of toner fixation, is likely to cause offset of the toner and offset of a receptive layer in the OHP image receiving sheet provided with a receptive layer through the action of heat and pressure. This requires the adoption of a method wherein a silicone oil is coated by means of a fixation roll at the time of fixation of the toner.

DISCLOSURE OF THE INVENTION

In view of the above problems of the prior art, it is an object of the present invention is to provide an image receiving sheet that has good toner fixation, can provide images having stably excellent image quality, is less likely to depend upon environmental conditions, has constant surface electric resistivity, and can be used in an electrophotographic system wherein no silicone oil is used at the time of toner fixation.

The above object of the present invention can be attained by an image receiving sheet comprising: a substrate; and a receptive layer provided on at least one side of the substrate, the receptive layer comprising a thermoplastic resin and a conductive material not utilizing any ionic conduction.

The conductive material preferably comprises a metal oxide or a conductive polymer material.

Preferably, the thermoplastic resin constituting the receptive layer comprises a polyester resin, and the thickness of the receptive layer is not more than 1 $\mu$m.

The metal oxide preferably comprises tin oxide doped with antimony.

Preferably, the tin oxide has a fiber length of 0.1 to 2 $\mu$m and comprises an acicular crystal having an aspect ratio of 10 to 50.

The receptive layer preferably always has a surface electric resistivity of $10^8$ to $10^{13}$ $\Omega$/square as measured under environmental conditions of temperature 10 to 30° C. and relative humidity 30 to 80%, the change in surface electric resistivity under said environmental conditions being within one order of magnitude.

The receptive layer is preferably provided on both sides of the substrate.

Preferably, the image receiving sheet further comprises a filler-containing backside layer provided on the other side of the substrate.

Preferably, the image receiving sheet further comprises a silicon-containing backside layer provided on the other side of the substrate.

The image receiving sheet preferably has a parallel light transmittance of not less than 70%.

Further, according to the present invention, there is provided a recording method for performing recording by electrophotography on an image receiving sheet, wherein the above image receiving sheet is used and no silicone oil is used at the time of fixation of a toner.

The image receiving sheet of the present invention comprises a substrate and a receptive layer provided on at least one side of the substrate, the receptive layer comprising a thermoplastic resin and a conductive material not utilizing ionic conduction. By virtue of this constitution, the image receiving sheet has antistatic properties and surface electric resistivity that are stable against a fluctuation in environment (temperature and humidity) around the image receiving sheet. When the thickness of the receptive layer is preferably not more than 1 µm, more preferably not more than 0.5 µm, the surface electric resistivity can be properly regulated and the offset of the toner and the receptive layer can be presented even in the case of electrophotography that does not utilize any silicone oil at the time of fixation of the toner in image formation. In this case, the surface temperature of the fixation roller is preferably brought to 50 to 100° C. higher than the softening point of the binder resin in the toner to satisfactorily heat and melt the toner. This flattens the toner. Further, when the thickness of the receptive layer is brought to a small value, that is, not more than 1 µm, the cohesive failure of the receptive layer is less likely to occur.

Further, the regulation of the content of the thermoplastic resin and the conductive material not utilizing ionic conduction and the thickness in the receptive layer permits the surface electric resistivity to be always regulated in the range of from $10^8$ to $10^{13}$ Ω/square as measured under environmental conditions of temperature 10 to 30° C. and relative humidity 30 to 80%, the change in surface electric resistivity under the above environmental conditions being within one order(figure) of magnitude.

Use of the image receiving sheet of the present invention, which has no significant dependency upon environment, has stable resistivity control, and has reduced thickness, can realize the formation of an image free from offset of the toner and the receptive layer, even in the case of electrophotography wherein no silicone oil is used at the time of fixation of the toner.

BEST MODE FOR CARRYING OUT THE INVENTION

Next, preferred embodiments of the present invention will be described with reference to the accompanying drawings.

Figure 1:
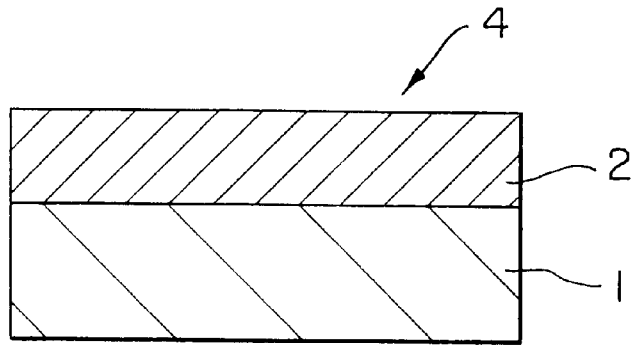
FIG. 1 is a longitudinal sectional view showing one embodiment of the image receiving sheet according to the present invention.

FIG. 1 is a longitudinal sectional view showing one embodiment of the image receiving sheet according to the present invention, that is, an image receiving sheet 4 comprising: a substrate 1; and a receptive layer 2 provided on one side of the substrate 1, the receptive layer 2 comprising a thermoplastic resin and a conductive material not utilizing any ionic conduction.

Figure 2:
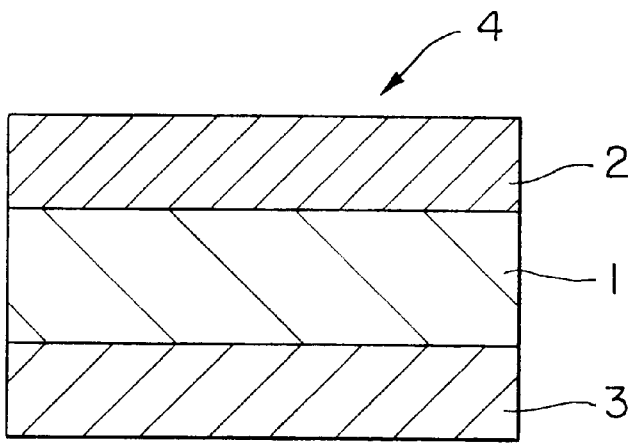
FIG. 2 is a longitudinal sectional view showing another embodiment of the image receiving sheet according to the present invention.

FIG. 2 is a longitudinal sectional view showing another embodiment of the image receiving sheet according to the present invention, that is, an image receiving sheet 4 comprising: a substrate 1; a receptive layer 2 provided on one side of the substrate 1, the receptive layer 2 comprising a thermoplastic resin and a conductive material not utilizing any ionic conduction; and a backside layer 3 provided on the other side of the substrate 1.

Figure 3:
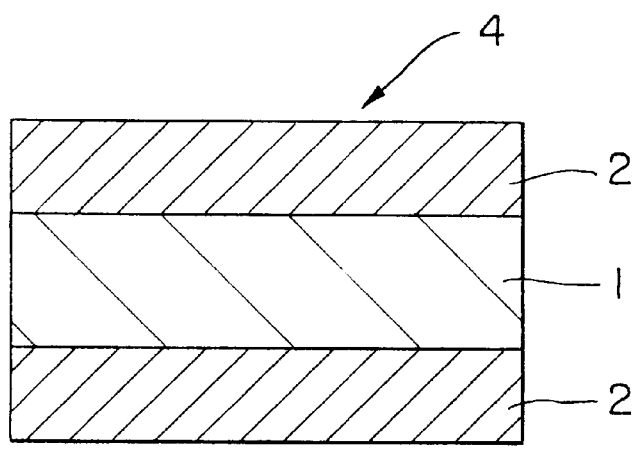
FIG. 3 is a longitudinal sectional view showing still another embodiment of the image receiving sheet according to the present invention.

FIG. 3 is a longitudinal sectional view showing still another embodiment of the image receiving sheet according to the present invention, an image receiving sheet 4 comprising: a substrate 1; and a receptive layer 2 provided on both sides of the substrate 1, the receptive layer 2 comprising a thermoplastic resin and a conductive material not utilizing any ionic conduction.

(Substrate)

Regarding, the substrate 1 used in the image receiving sheet of the present invention, for example, when the image receiving sheet is used for applications where a recorded image is viewed through transmitted light, such as OHP sheets, the substrate 1 is preferably made of a thermoplastic resin having transparency, heat resistance, dimensional stability, and rigidity. Specific examples of preferred substrates include about 10 to 250 µm-thick, preferably about 50 to 180 µm-thick, films or sheets of polyethylene terephthalate resin, polyethylene naphthalate resin, polycarbonate resin, acrylic resin, polyvinyl chloride resin, polypropylene resin, polystyrene resin, polyethylene resin, cellulose diacetate resin, and cellulose triacetate resin. Among them, the polyethylene terephthalate resin is more preferred from the above properties.

When the image receiving sheet of the present invention is used for applications where recorded image is viewed through transmitted light, such as OHP sheets, the image receiving sheet preferably comprises a substrate 1, a layer containing a thermoplastic resin and a conductive material utilizing no ionic conduction, and an optional backside layer, the parallel light transmittance of the image receiving sheet being not less than 70%. This can realize an excellent transmitted image.

On the other hand, when the image receiving sheet is used in applications where recorded images are viewed through reflected light, the resin sheet or film is preferably an opaque sheet or film, such as a white sheet or film, with a colorant or the like added thereto. In this case, examples of the substrate 1 include papers, such as plain papers and coated papers, plastic films, and plastic-based synthetic papers. Further, in the case of semitransparent substrates, the image receiving sheet can also be used in illumination applications. It should be noted that conventional treatment for improving the adhesion, such as primer treatment or corona discharge treatment, may be carried out on the surface of the substrate 1 from the viewpoint of improving the adhesion to the layer formed on the substrate 1.

(Receptive layer)

The image receiving sheet 4 of the present invention comprises: a substrate 1; and a receptive layer 2 provided on at least one side of the substrate 1, the receptive layer 2 comprising a thermoplastic resin and a conductive material not utilizing any ionic conduction.

The receptive layer 2 contains the conductive material not utilizing any ionic conduction and hence possesses excellent antistatic properties and toner fixation.

In particular, when the image receiving sheet is used in applications in a full-color electrographic system, a resin having excellent compatibility with color toners is preferably used in the receptive layer 2. Examples of resins usable in the formation of the receptive layer 2 include: polyolefin resins, such as polyethylene and polypropylene; vinyl resins, such as polyvinyl chloride, polyvinylidene chloride, polyvinyl acetate, vinyl chloride/vinyl acetate copolymer, polyacrylic ester, and polystyrene; polyester resins comprising diols, having a bisphenol skeleton or an alkylene skeleton, polycondensed with dicarboxylic acids or tricarboxylic acids; polyamide resins; copolymers of polyolefins, such as ethylene or propylene, with other vinyl monomers; ionomers; cellulosic resins, such as ethyl cellulose or cellulose acetate; polycarbonate resins; and phenoxy resins.

When the conductive material is hydrophilic, the thermoplastic resin for the receptive layer is preferably a water soluble or water-dispersible polyester resin having a carboxyl group from the viewpoint of the adhesion to the substrate and the compatibility to the toner. Examples of polyester resins usable herein include Polyester (tradename, available from Nippon Synthetic Chemical Industry Co., Ltd.) and the like, Vylonal available from Toyobo Co., Ltd., and Finetex, manufactured by Dainippon Ink and Chemicals, Inc.

When the conductive material is lipophilic, the thermoplastic resin for the receptive layer may be those that are soluble in solvents.

Polyester resins comprising ethylene glycol- or propylene glycol-modified bisphenol A as the diol moiety have excellent toner fixation. There is no particular limitation on the acid moiety of the polyester resin. Examples thereof include fumaric acid, phthalic acid, terephthalic acid, isophthalic acid, maleic acid, succinic acid, adipic acid, citraconic acid, itaconic acid, sebacic acid, malonic acid, hexacarboxylic acid, and trimellitic acid.

Among the polyester resins, those comprising propylene glycol- or ethylene glycol-modified bisphenol A as the diol moiety and fumaric acid, maleic acid, terephthalic acid, or trimellitic acid as the acid moiety have good compatibility particularly with the binder resin in the toner and good toner fixation and toner wettability and can provide images having good quality.

These resins have a softening point of 30 to 200° C. When the softening point is below 30° C., the storage stability is unfavorably poor. In this case, when image receiving sheets are stacked together, the receptive layer comes into contact with contact surfaces, that is, the so-called "blocking" is likely to occur. On the other hand, a softening point above 200° C. is unfavorable because a large amount of energy is necessary at the time of image formation.

Conductive materials not utilizing any ionic conduction, which are contained in the receptive layer, include conductive polymer materials having electroconduction-type metallic conductivity, or metals and oxides thereof.

Conductive polymer materials having electroconduction-type metallic conductivity are characterized by having a π-electron conjugate structure. Specific examples of conductive polymer materials having electroconduction-type metallic conductivity usable herein include sulfonated polyaniline, chemically doped polyacetylene, polyparaphenylene vinylene, polyparaphenylene sulfide, chemically polymerized and doped polypyrrole, polythiophene, polyaniline, heat treated product of phenolic resin produced by heat treatment, heat treated product of polyamide, and heat treated product of perylenic anhydride.

Polythiophenes usable herein include those comprising repeating units represented by formula

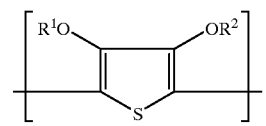

wherein $R^1$ and $R^2$ each independently represent hydrogen or an alkyl having 1 to 4 carbon atoms or combines with each other to form an optionally substituted alkylene having 1 to 4 carbon atoms.

Sulfonated polyanilines are useful as the conductive polymer material having a π-electron conjugate structure. Various sulfonated polyanilines are known in the art. Sulfonated polyanilines represented by the chemical formula below may be mentioned as an example thereof:

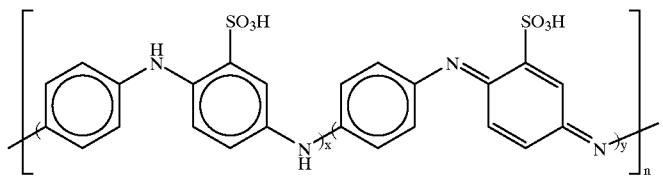

wherein x, y, and n are values that provide a molecular weight of about 300 to 10,000.

The above sulfonated polyanilines are soluble in a solvent containing water or an aqueous alkali. In this case, the sulfonated polyanilines are dissolved with the formation of an intramolecular salt or an alkali salt. These sulfonated polyanilines usable herein are available as an aqueous solution or a solution thereof in a mixed solvent composed of water and an organic solvent, for example, from Nitto Chemical Industry Co., Ltd. under the tradename aqua Pass-01Z. These solutions are yellowish and, when the concentration is low, are substantially colorless. When the image receiving sheet is used in applications where recorded images are viewed through transmitted light, such as OHP sheets, the image receiving sheet should be transparent. In this case, the above solutions are usable without posing any problem.

Metal oxides usable herein include, for example, zinc oxide (ZnO), tin oxide ($SnO_2$), indium oxide ($In_2O_3$), and titanium oxide ($TiO_2$). If necessary, dopants may be added to these metal oxides. Regarding the dopant, in general, Al (aluminum) and Sb (antimony) are used as the dopant for zinc, Sb (antimony) is used for tin, and tin is used for $In_3O_3$. The metal oxides may be used alone or in a combination of two or more. Further, the metal oxides may be coated with $SnO_2$ or Sb-doped $SnO_2$.

In the image receiving sheet of the present invention, $SnO^2$ or $SnO_2$-coated metal oxides are preferably used with Sb-doped $SnO_2$ being particularly preferred, from the viewpoint of coatability as the metal oxide, stable surface electric resistivity, metal electric conductivity, cost and the like.

These metal oxides may be in a spherical or acicular crystal form. In the case of the spherical crystal, the primary particle diameter is preferably 10 to 1000 nm. On the other hand, in the case of the acicular crystal, preferably, the fiber length is in the range of from 0.1 to 2 µm with the aspect ratio being in the range of from 10 to 50. Use of an acicular metal oxide having the above size can improve the transparency of the receptive layer and, when used in applications where recorded images are viewed through transmitted light, such as OHP sheets, can enhance the quality of transmitted images. Regarding the formulation of a coating liquid for a receptive layer using the metal oxide, the weight of the metal oxide/weight of thermoplastic resin is preferably 0.2 to 2.0. When the weight ratio is less than 0.2, the amount of the metal oxide is so small that the surface electric resistivity of the receptive layer is unstable. On the other hand, when the weight ratio exceeds 2.0, particularly in the case of Sb-doped $SnO_2$, the color inherent in the metal oxide is unfavorably noticeable. (In the case of the Sb-doped $SnO_2$, a bluish color noticeably appears on the surface of the sheet.)

A coating liquid for a receptive layer using the conductive polymer material is preferably formulated to give a composition comprising about 0.5 to 10% by weight, preferably 0.75 to 2% by weight, of the binder resin, about 0.01 to 3% by weight, preferably 0.01 to 1% by weight, on a solid basis of the conductive polymer material having π-electron conjugate structure, and about 0 to 2% by weight, preferably 0.2 to 1% by weight, of the surfactant with the balance consisting of the solvent. In particular, when the antistatic agent is sulfonated polyaniline, selection of a solvent composition such that the sulfonated aniline can exist as particles having a size of 0.01 to 1.0 µm in the coating liquid for a receptive layer provides the best antistatic effect.

Specifically, although the sulfonated polyaniline is soluble in water, it is insoluble in water-soluble organic solvents. In the preparation of the coating liquid, the regulation of the water to water-soluble organic solvent mixing ratio and, if necessary, additional use of a suitable surfactant permit the sulfonated polyaniline to be brought to finely dispersed particles. The particle size distribution of the sulfonated polyaniline in the coating liquid may be varied by varying the mixing ratio of water to organic solvent as the liquid medium.

Incorporation of any one or both of an organic filler and an inorganic filler into the receptive layer 2 can improve the carriability of the image receiving sheet. Organic fillers usable herein include fillers of organic resins, for example, fluororesins, such as ethylene tetrafluoride resin and ethylene/ethylene tetrafluoride copolymer, polyethylene resin, polystyrene resin, acrylic resin, polyamide resin, and benzoguanamine resin. Inorganic fillers usable herein include silica, colloidal silica, alumina, kaolin, clay, calcium carbonate, talc, titanium dioxide, and calcium carbonate. The average diameter of filler particles incorporated is preferably in the range of from 0.1 to 10 µm and greater than the thickness of the receptive layer. When the average particle diameter is less than 0.1 µm, the desired effect is unsatisfactory. On the other hand, when the average particle diameter exceeds 10 µm, the filler cannot be disadvantageously held in the receptive layer. The content of the filler is preferably in the range of from 0.1 to 10% by weight based on the resin for the receptive layer. When the content of the filler is excessively large, the transparency is lowered. In particular, when the image receiving sheet is used in applications where transparency is required, the upper limit of the content is preferably 5% by weight from the viewpoint of limiting the haze to not more than 10. On the other hand, when the content is excessively low, the desired effect of improving the carriability of the image receiving sheet cannot be attained. Besides the above filler, additives, such as various surfactants, waxes, and oils may be incorporated so far as the effect of the present invention is not deteriorated. The receptive layer may be formed by applying a coating liquid comprising the resin component, the conductive material, and optional fine particles and various additives by conventional printing means, such as gravure printing or silk screen printing, or conventional coating means, such as gravure coating. The thickness of the coating is preferably 0.05 to 1.0 µm on a dry basis. When the thickness is smaller than the above lower limit, the surface electric resistivity is so high that the image quality is likely to lower. On the other hand, when the thickness exceeds 1.0 µm, offset of the receptive layer is likely to occur due to cohesive failure. In this case, the image receiving sheet is likely to be stuck on a fixation roller or the like at the time of carrying through a printer.

For the receptive layer according to the present invention, preferably, regulation of the thickness to 0.05 to 1.0 µm and regulation of the formulation of the conductive material enable the surface electric resistivity to be always kept at $10^8$ to $10^{13}$ Ω/square as measured under environmental conditions of temperature 0 to 30° C. and relative humidity 30 to 80%, the change in surface electric resistivity being regulated within one order of magnitude. Thus, the surface electric resistivity can be regulated by the above simple method.

(Backside layer)

The image receiving sheet of the present invention preferably comprises: a substrate; a receptive layer provided on at least one side of the substrate, the receptive layer comprising a thermoplastic resin and a conductive material not utilizing any ionic conduction; and optionally a filler- or silicon group-containing backside layer 3 provided on the other side of the substrate. The backside layer 3 may be provided on the substrate in its side remote from the receptive layer from the viewpoint of further improving the carriability and preventing the receptive layer on the substrate surface side being curled. When the backside layer 3 has the same receptivity to an image as the receptive layer on the surface of the substrate, an image may be formed independently of whether the image receiving face is the front surface or the back surface, or on both sides of the image receiving sheet. When the backside of the image receiving sheet should have given surface electric resistivity, the conductive material used in the receptive layer may be added.

The backside layer 3 may be formed of an acrylic resin, a polyester resin, a urethane resin, or a thermoplastic resin with a silicone group added thereto, such as a silicone-modified acrylic resin, a silicone-modified urethane resin, or a silicone-modified polyester resin. Further, graft copolymers comprising at least one releasable segment, selected from a polysiloxane segment, a carbon fluoride segment, and a long-chain alkyl segment, borne on a backbone of the binder resin of an acrylic, vinyl, polyester, polyurethane, polyamide, or cellulosic resin may also be used as the thermoplastic resin.

The backside layer 3 may be formed by mixing the above resin with an organic filler or an inorganic filler and optional additives and applying the mixture by the same conventional coating means as used in the formation of the receptive layer. Regarding the thickness of the backside layer 3, a thickness of about 0.01 to 1.0 µm on a dry basis suffices for attaining satisfactory effect. When the surface electric resistivity is regulated, a corresponding thickness is necessary with the thickness being preferably about 0.1 to 2.0 μm.

Regarding the filler for the backside layer, organic fillers usable herein include fillers of organic resins, for example, fluororesins, such as ethylene tetrafluoride resin and ethylene/ethylene tetrafluoride copolymer, polyethylene resin, polystyrene resin, acrylic resin, polyamide resin, and benzoguanamine resin. Inorganic fillers usable herein include silica, colloidal silica, alumina, kaolin, clay, calcium carbonate, talc, titanium dioxide, and calcium carbonate.

Provision of the receptive layer on the backside layer according to the present invention and regulation of the contents of the resin as the binder, other additives, and the solvent, and the coverage permit the surface electric resistivity to be always regulated in the range of from $10^8$ to $10^{13}$ Ω/square as measured under environmental conditions of temperature 10 to 30° C. and relative humidity 30 to 80%, the change in surface electric resistivity under the above environmental conditions being within one order of magnitude. Conventional antistatic agents may be coated. The surface electric resistivity may be regulated by the above simple method.

In the image receiving sheet of the present invention, the surface electric resistivity of the receptive layer and optionally the backside layer are specified, and, in the form of an image receiving sheet as the final form, an image is formed while always regulating the surface electric resistivity of the receptive layer in the range of from $10^8$ to $10^{13}$ Ω/square as measured under environmental conditions of temperature 10 to 30° C. and relative humidity 30 to 80%, the change in surface electric resistivity under the above environmental conditions being within one order of magnitude.

In the image receiving sheet, when the surface electric resistivity of the receptive layer is lower than $10^8$ Ω/square, the transfer efficiency is lowered, resulting in lowered record density. On the other hand, a surface electric resistivity exceeding $10^{13}$ Ω/square develops unfavorable phenomena, such as occurrence of discharge at the time of paper separation after the transfer of the toner or scattering of the toner on the image receiving sheet. This results in disordered recorded letters and images, that is, lowered image quality.

(Recording method)

The recording method for performing recording on an image receiving sheet according to the present invention utilizes electrophotography and is characterized in that the image receiving sheet of the present invention is used and no silicone oil is used at the time of fixation of a toner.

When the toner recorded on the photoreceptor is transferred onto an OHP sheet and melted and fixed by means of a fixation roller, heat and pressure are likely to cause offset of the toner per se and, in the case of OHP image receiving sheets having a receptive layer, are likely to cause cohesive failure of the receptive layer per se. For this reason, fixation by means of a fixation roller with a silicone oil applied thereto has hitherto been adopted to prevent the offset. In this method, however, the silicone oil stays on the surface of the image receiving sheet. This renders the surface sticky or results in deteriorated image quality. By contrast, according to the image receiving sheet of the present invention, when a recording method not using any silicone oil at the time of fixation of the toner is used and, in particular, the thickness of the receptive layer is brought to not more than 1 μm, the cohesive failure (offset) of the receptive layer can be prevented at the time of fixation of the toner. This can solve the above problem.

In this case, when the surface temperature of the roller at the time of fixation of the toner is brought to 50 to 100° C. higher than the softening point of the binder resin in the toner to satisfactorily melt the toner, at the time of fixation, the toner is flattened, which can prevent blackening at the time of projection of OHP images, that is, graying of the toner.

The following examples further illustrate the present invention. In the following examples, "parts" or "%" is by weight unless otherwise specified.

EXAMPLE 1

The following substrate and coating liquid 1 for a receptive layer were provided. A receptive layer having a thickness of 0.8 μm on a dry basis was provided on one side of the substrate. Thus, an image receiving sheet of Example 1 was prepared.

Substrate

A 100 μm-thick polyethylene terephthalate film

| Coating liquid 1 for receptive layer | |
|---|---|
| Polyester resin emulsion (solid content 30%) (polymer of terephthalic acid and propylene glycol-modified bisphenol A, Tg = 60° C., softening point = 100° C.) | 30 parts |
| Water dispersion of fine particles of antimony-doped tin oxide (average particle diameter 20 nm, solid content 30%) | 30 parts |
| IPA | 35 parts |
| Water | 35 parts |

EXAMPLE 2

The procedure of Example 1 was repeated, except that coating liquid 1, for a backside layer, having the following composition was additionally coated on the substrate in its side remote from the receptive layer to form a backside layer having a thickness of 1 μm on a dry basis. Thus, an image receiving sheet of Example 2 was prepared.

| Coating liquid 1 for backside layer | |
|---|---|
| Acrylic resin (solid content 15%) (BR-85, manufactured by Mitsubishi Rayon Co., Ltd) | 20 parts |
| Fine particles of silica (average particle diameter 3 μm) | 0.05 part |
| Methyl ethyl ketone | 40 parts |
| Toluene | 40 parts |

EXAMPLE 3

The procedure of Example 1 was repeated, except that coating liquid 1 for a receptive layer coated on one side of the substrate was changed to coating liquid 2, for a receptive layer, having the following composition. Thus, an image receiving sheet of Example 3 was prepared.

| Coating liquid 2 for receptive layer | |
|---|---|
| Polyester resin emulsion (solid content 30%) (polymer of terephthalic acid and ethylene glycol, Tg = 60° C., softening point = 100° C.) | 30 parts |
| Water dispersion of fine particles of acicular antimony-doped tin oxide (fiber length 0.5 μm, aspect ratio 20, solid content 20%) | 20 parts |
| IPA | 30 parts |
| Water | 20 parts |

EXAMPLE 4

The procedure of Example 1 was repeated, except that coating liquid 3, for a receptive layer, having the following composition was used instead of coating liquid 1 for a receptive layer and coated on the substrate in its side opposite to the side on which the receptive layer was formed in Example 1. Thus, an image receiving sheet of Example 4 was prepared.

| Coating liquid 3 for receptive layer | |
|---|---|
| Polyester resin emulsion (solid content 30%) (polymer of terephthalic acid and ethylene glycol, Tg = 60° C., softening point = 100° C.) | 20 parts |
| Sulfonated polyaniline (solid content 10%) | 10 parts |
| IPA | 40 parts |
| Water | 30 parts |

EXAMPLE 5

The procedure of Example 1 was repeated, except that coating liquid 4, for a receptive layer, having the following composition was used instead of coating liquid 1 for a receptive layer and coated on the substrate in its side opposite to the side on which the receptive layer was formed in Example 1. Thus, an image receiving sheet of Example 5 was prepared.

| Coating liquid 4 for receptive layer | |
|---|---|
| Polyester resin emulsion (solid content 30%) (polymer of terephthalic acid and ethylene glycol, Tg = 60° C., softening point = 100° C.) | 30 parts |
| Water dispersion of zinc antimonate (ZnO.Sb$O_5$) (average particle diameter 20 nm, solid content 30%) | 30 parts |
| IPA | 20 parts |
| Water | 20 parts |

EXAMPLE 6

Coating liquid 2, for a backside layer, having the following composition was coated onto the backside of the image receiving sheet prepared in Example 3 to form a backside layer having a thickness of 0.5 μm on a dry basis. Thus, an image receiving sheet of Example 6 was prepared.

| Coating liquid 2 for backside layer | |
|---|---|
| Silicone-modified acrylic resin (solid content 20%) (US-3700, manufactured by Toa Gosei Chemical Industry Co., Ltd.) | 40 parts |
| Methyl ethyl ketone | 30 parts |
| Toluene | 30 parts |

EXAMPLE 7

Coating liquid 2 for a receptive layer used in Example 3 was coated on both sides of the same substrate as used in Example 1 to form a receptive layer on both sides of the substrate. Thus, an image receiving sheet of Example 7 was prepared. The receptive layers provided on respective sides of the substrate each had a thickness of 0.8 μm on a dry basis.

EXAMPLE 8

A 100 μm-thick polyethylene terephthalate film (Lumirror, manufactured by Toray Industries, Inc.) was provided as a substrate film. Coating liquid 1, for a receptive layer, having the following composition was gravure-coated on one side of the substrate, and the coating was dried to form a receptive layer having a thickness of 1 μm on a dry basis. Thus, a recording sheet was obtained.

| Coating liquid 1 for receptive layer | |
|---|---|
| Aqueous polyester resin solution (solid content 30%) | 10 parts |
| Polythiophene (1% aqueous solution of Baytron P) | 50 parts |
| Isopropanol/water (1/1) | 40 parts |

COMPARATIVE EXAMPLE 1

The same substrate as used in Example 1 was provided. Coating liquid 5, for a receptive layer, having the following composition was coated on one side of the substrate to form a receptive layer having a thickness of 3 μm on a dry basis. A coating liquid, for an antistatic layer, having the following composition was coated on the receptive layer to form an antistatic layer having a thickness of 0.5 μm on a dry basis. Thus, an image receiving sheet of Comparative Example 1 was prepared.

| Coating liquid 5 for receptive layer | |
|---|---|
| Polyester resin solution (solid content 30%) (polymer of terephthalic acid and propylene glycol-modified bisphenol A, Tg = 60° C., softening point = 100° C.) | 50 parts |
| Fine particles of silica (average particle diameter 5 μm) | 0.15 part |
| Methyl ethyl ketone | 35 parts |
| Toluene | 35 parts |

| Coating liquid for antistatic control layer | |
|---|---|
| Quaternary ammonium surfactant (Chemistat 7300, manufactured by Sanyo Chemical Industries, Ltd.) | 0.1 part |
| IPA | 100 parts |

The image receiving sheets of the examples and the comparative examples thus obtained were evaluated for the dependency of the image quality upon environment and the dependency of the surface electric resistivity upon environment by the following methods.

(Evaluation methods)

Dependency of Image Quality Upon Environment

A color chart image was formed on each image receiving sheet using a full-color printer manufactured by the present inventors (a hot roller fixation system by electrophotography wherein no silicone oil was used at the time of fixation of the toner, softening point of binder for toner: 100° C., surface roll temperature: 180° C.) under an environment of a temperature of 10° C. and a relative humidity of 30%, an environment of a temperature of 25° C. and a relative humidity of 50%, and an environment of a temperature of 30° C. and a relative humidity of 80%. The image quality was visually evaluated. Criteria for the evaluation were as follows.

◯: Good transfer of toner

Δ: Slight failure of toner to be transferred

×: Considerable failure of toner to be transferred

Dependency of Surface Electric Resistivity Upon Environment

For each image receiving sheet, the surface electric resistivity of the receptive layer was measured with a high resistivity measuring machine manufactured by Advantest Co., Ltd. under an environment of a temperature of 10° C. and a relative humidity of 30%, an environment of a temperature of 25° C. and a relative humidity of 50%, and an environment of a temperature of 30° C. and a relative humidity of 80%.

Offset of Receptive Layer

A color chart image was formed on each image receiving sheet by means of the printer under the above conditions to visually evaluate the offset of the receptive layer, that is, cohesive failure of the receptive layer. Criteria for the evaluation were as follows.

○: Offset of receptive layer not developed at all

×: Offset of receptive layer developed (Results of evaluation)

The results of evaluation for the examples and the comparative examples are summarized in Tables 1 and 2.

TABLE 1

| | Dependency of image quality upon environment | | | Offset of receptive layer |
|---|---|---|---|---|
| | 10° C., 30% | 25° C., 50% | 30° C., 80% | |
| Ex. 1 | ○ | ○ | ○ | ○ |
| Ex. 2 | ○ | ○ | ○ | ○ |
| Ex. 3 | ○ | ○ | ○ | ○ |
| Ex. 4 | Δ | Δ | Δ | ○ |
| Ex. 5 | ○ | ○ | ○ | ○ |
| Ex. 6 | ○ | ○ | ○ | ○ |
| Ex. 7 | ○ | ○ | ○ | ○ |
| Comp. Ex. 1 | ○ | ○ | ○ | X |

TABLE 2

| | Dependency of surface electric resistivity of receptive layer upon environment, Ω/square | | |
|---|---|---|---|
| | 10° C., 30% | 25° C., 50% | 30° C., 80% |
| Ex. 1 | $1.3 \times 10^{10}$ | $1.0 \times 10^{10}$ | $1.0 \times 10^{10}$ |
| Ex. 2 | $1.3 \times 10^{10}$ | $1.0 \times 10^{10}$ | $1.0 \times 10^{10}$ |
| Ex. 3 | $1.5 \times 10^{11}$ | $1.0 \times 10^{11}$ | $1.0 \times 10^{11}$ |
| Ex. 4 | $5.5 \times 10^{9}$ | $5.0 \times 10^{9}$ | $3.0 \times 10^{9}$ |
| Ex. 5 | $5.0 \times 10^{10}$ | $3.0 \times 10^{10}$ | $2.0 \times 10^{10}$ |
| Ex. 6 | $1.5 \times 10^{11}$ | $1.0 \times 10^{11}$ | $1.0 \times 10^{11}$ |
| Ex. 7 | $1.5 \times 10^{11}$ | $1.0 \times 10^{11}$ | $1.0 \times 10^{11}$ |
| Comp. Ex. 1 | $3.0 \times 10^{11}$ | $1.0 \times 10^{10}$ | $5.0 \times 10^{8}$ |

As described above, the image receiving sheet of the present invention comprises a substrate and a receptive layer provided on at least one side of the substrate, the receptive layer comprising a thermoplastic resin and a conductive material not utilizing ionic conduction. By virtue of this constitution, the image receiving sheet has antistatic properties and surface resistivity that are stable against a fluctuation in environment (temperature and humidity) around the image receiving sheet. When the thickness of the receptive layer is preferably not more than 1 μm to control the surface electric resistivity, the cohesive failure of the receptive layer is less likely to occur, making it possible to prevent offset of the receptive layer, even in the case of electrophotography that does not utilize any silicone oil at the time of fixation of the toner in image formation.

Further, the regulation of the content of the thermoplastic resin and the conductive material not utilizing ionic conduction and the thickness in the receptive layer permits the surface electric resistivity to be always regulated in the range of from $10^8$ to $10^{13}$ Ω/square as measured under environmental conditions of temperature 10 to 30° C. and relative humidity 30 to 80%, the change in surface electric resistivity under said environmental conditions being within one order of magnitude.

Use of the image receiving sheet of the present invention, which has no significant dependency upon environment and has stable antistatic properties and surface electric resistivity, can realize the formation of an image free from offset of the toner and the receptive layer, even in the case of electrophotography wherein no silicone oil is used at the time of fixation of the toner.

We claim:

1. An electrophotography image receiving sheet comprising:

a substrate and a receptive layer provided on at least one side of the substrate, said receptive layer comprising a thermoplastic resin and a conductive material utilizing no ionic conduction, said image receiving sheet having a parallel light transmittance of at least 70%.

2. The image receiving sheet according to claim 1, wherein the conductive material comprises a metal oxide.

3. The image receiving sheet according to claim 1, wherein the conductive material comprises a conductive polymer material.

4. The image receiving sheet according to claim 1, wherein the thermoplastic resin constituting the receptive layer comprises a polyester resin.

5. The image receiving sheet according to claim 2, wherein the metal oxide comprises tin oxide doped with antimony.

6. The image receiving sheet according to claim 5, wherein the tin oxide has a fiber length of 0.1 to 2 μm and comprises an acicular crystal having an aspect ratio of 10 to 50.

7. The image receiving sheet according to claim 1, wherein the receptive layer has a thickness of not more than 1 μm.

8. The image receiving sheet according to claim 1, wherein the receptive layer has a surface electric resistivity of $10^8$ to $10^{13}$ Ω/square as measured under environmental conditions of temperature 10 to 30° C. and relative humidity 30 to 80%, the change in surface electric resistivity under said environmental conditions being within one order of magnitude.

9. The image receiving sheet according to claim 1, wherein the receptive layer is provided on both sides of the substrate.

10. The image receiving sheet according to claim 1, which further comprises a backside layer containing a silicon group provided on the other side of the substrate.

11. The image receiving sheet according to claim 1, which further comprises a silicon-containing backside layer provided on the other side of the substrate.

12. A recording method for performing recording by electrophotography on an image receiving sheet, wherein the image receiving sheet according to any one of claim 1 is used and no silicone oil is used at the time of fixation of a toner.

* * * * *